United States Patent [19]
Prevost

[11] Patent Number: 5,602,331
[45] Date of Patent: Feb. 11, 1997

[54] ENGINE MISFIRE DETECTION WITH CASCADE FILTER CONFIGURATION

[75] Inventor: John M. Prevost, Jackson, Mich.

[73] Assignee: Chrysler Corporation, Auburn Hills, Mich.

[21] Appl. No.: 468,113

[22] Filed: Jun. 6, 1995

[51] Int. Cl.⁶ .................................................. G01M 15/00
[52] U.S. Cl. .................... 73/116; 123/370; 123/419; 364/431.07
[58] Field of Search .................... 73/116, 117.2, 73/117.3; 364/431.07, 431.08; 123/370, 371, 419

[56] References Cited

U.S. PATENT DOCUMENTS

| | | | |
|---|---|---|---|
| 3,908,366 | 9/1975 | Masaki | 73/117.3 |
| 4,179,922 | 12/1979 | Bouverie et al. | 73/116 |
| 4,186,701 | 2/1980 | Suzuki et al. | 123/119 A |
| 4,271,811 | 6/1981 | Suzuki et al. | 123/571 |
| 4,308,519 | 12/1981 | Garcea et al. | 340/53 |
| 4,461,257 | 7/1984 | Hosaka et al. | 123/419 |
| 4,488,528 | 12/1984 | Morikawa | 123/425 |
| 4,491,110 | 1/1985 | Bone et al. | 123/425 |
| 4,532,592 | 7/1985 | Citron et al. | 364/431.05 |
| 4,562,818 | 1/1986 | Kohama et al. | 123/478 |
| 4,606,224 | 8/1986 | Tedeschi et al. | 73/117.3 |
| 4,716,874 | 1/1988 | Hilliard et al. | 123/425 |
| 4,782,692 | 11/1988 | Peden et al. | 73/117.3 |
| 4,846,129 | 7/1989 | Noble | 123/425 |
| 4,862,093 | 8/1989 | Jiewertz | 324/464 |
| 4,886,029 | 12/1989 | Lill et al. | 123/479 |
| 4,928,228 | 5/1990 | Fujimoto et al. | 364/431.09 |
| 4,930,479 | 6/1990 | Osawa et al. | 123/436 |
| 4,930,481 | 6/1990 | Fujimoto et al. | 123/481 |
| 4,932,379 | 6/1990 | Tang et al. | 73/117.3 |
| 4,936,277 | 6/1990 | Deutsch et al. | 123/436 |
| 4,941,445 | 7/1990 | Deutsch | 123/414 |
| 4,976,241 | 12/1990 | Ishida et al. | 123/425 |
| 4,987,711 | 1/1991 | Noji et al. | 52/1 |
| 4,987,771 | 1/1991 | Iwata | 73/117.3 |
| 5,021,960 | 6/1991 | Manaka et al. | 364/431.01 |
| 5,044,194 | 9/1991 | James et al. | 73/116 |
| 5,044,195 | 9/1991 | James et al. | 73/117.3 |
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,117,681 | 6/1992 | Dosdall et al. | 73/116 |
| 5,144,927 | 9/1982 | Denz | 123/425 |
| 5,231,869 | 8/1993 | Klenk et al. | 73/116 |
| 5,361,629 | 11/1994 | McCombie | 73/117.3 |
| 5,392,641 | 2/1995 | McCombie | 73/117.3 |
| 5,440,922 | 8/1995 | Ichikawa | 73/117.3 |

*Primary Examiner*—Richard Chilcot
*Assistant Examiner*—George M. Dombroske
*Attorney, Agent, or Firm*—Mark P. Calcaterra

[57] ABSTRACT

An apparatus and method are provided for detecting cylinder misfires in an internal combustion engine of a motor vehicle which provides a good signal to noise ratio and is capable of distinguishing from noise related events such as misfire induced bobble and harsh clutching maneuvers. Crankshaft rotation is sensed and crankshaft velocities are measured for each cylinder. Changes in angular velocity are determined and correspond to each of a plurality of cylinder firing events. With a first averaging filter, angular velocity changes are sorted over a predetermined series of cylinder firings and the two middle angular velocity changes are averaged to provide an average change in velocity value. A deviation is determined between the change in angular velocity for a selected cylinder and the average change in velocity. With a second averaging filter, the deviations from the first averaging filter are sorted over a series of cylinder firings and the two middle most deviations are averaged to provide an average change of deviation thereof. A second deviation is determined between the change in the first deviation for a selected cylinder and the average deviation value. The second deviation is compared to a threshold value and a misfire event is determined for the selected cylinder based on the comparison. Any number of two or more cascade connected average filters may be employed.

12 Claims, 10 Drawing Sheets

ENGINE MISFIRE DETECTION WITH CASCADE FILTER CONFIGURATION

CROSS-REFERENCE TO RELATED APPLICATIONS

This application relates to the following simultaneously filed patent applications titled "Engine Misfire Detection with Compensation for Normal Acceleration of Crankshaft" having Ser. No. 468,117 and application titled "Engine Misfire Detection with Rough Road Inhibit" having Ser. No. 469,040. These related applications are hereby incorporated by reference.

BACKGROUND OF THE INVENTION

1. Technical Field

The present invention relates generally to internal combustion engines and, more particularly, to a misfire detection apparatus and method for detecting misfire of individual cylinders in an internal combustion engine.

2. Discussion

The Clean Air Act (1955) required motor vehicle manufacturers to reduce exhaust emissions of carbon monoxide, hydrocarbons, and oxides of nitrogen from light duty motor vehicles. To comply with the Act, most motor vehicle manufacturers generally use catalytic converters on production vehicles to control such exhaust emissions. A catalytic converter typically includes a catalyst and operates at a very high temperature in order to burn unwanted byproducts of combustion so as to reduce hydrocarbons, carbon monoxide and nitrous oxide. However, increased amounts of unburned byproducts that often remain after the occurrence of an engine misfire can lead to damage of the catalytic converter.

More recently, regulatory agencies have proposed that passenger, light-duty and medium-duty motor vehicles with feedback fuel control systems be equipped with a malfunction indicator signal that will inform the motor vehicle operator of any malfunction of an emission-related component that interfaces with an on-board computer of the motor vehicle. It is also proposed or required that an on-board diagnostic system identify the likely area of malfunction. Proposals or requirements have set forth catalyst, misfire, evaporative purge system, secondary air system, air conditioning system refrigerant, fuel system, oxygen sensor, exhaust gas recirculation, and comprehensive component monitoring requirements.

As previously mentioned, misfire of internal combustion engines can cause damage to the catalyst of a catalytic converter. With respect to misfire, the identification of the specific cylinder experiencing misfire may be required. Some regulations provide that the motor vehicle manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a durability demonstration motor vehicle to fail a Federal Test Procedure (FTP) by more than 150% of the applicable standard if the degree of misfire were present from the beginning of the test; and (3) the degree of misfire evaluated in a certain number of revolution increments which would cause a durability demonstration motor vehicle to fail an inspection and maintenance (IM) program tailpipe exhaust emission test.

Current and proposed future regulations are also requiring that motor vehicle manufacturers be able to provide information detailing the occurrence of misfires such as identifying which cylinders are responsible for one or more misfires. The misfire information need be collected and stored in memory so that the stored information may be downloaded at a service center and used to determine the cause of misfires in the vehicle. One misfire detection and identification approach is disclosed in issued U.S. Pat. No. 5,361,629 issued Nov. 8, 1994 and titled "Single Sensor Misfire Detection Apparatus and Method for an Internal Combustion Engine". The above-cited patent is also hereby incorporated by reference. The misfire detection approach in the above-cited patent senses rotation of a crankshaft and calculates a crankshaft velocity based on the sensed rotation. The calculated crankshaft velocity or a compensated velocity is compared to a predetermined crankshaft velocity range to determine if misfire occurred.

When an engine cylinder misfires, a corresponding drop in engine speed will normally result. A relatively large drop in engine speed is usually indicative of a misfire event. However, a number of engine operating conditions may result in transients which sometimes tend to give the same effect as a misfire, even though a misfire event did not occur for the corresponding cylinder at issue. One example of a transient condition may occur when harsh clutching maneuvers are performed on a vehicle equipped with a manual transmission. When this occurs, torsional forces and vibrations transmitted through the engine crankshaft are induced to the engine speed pickup and may actually be large enough to read as misfire events with some conventional misfire detection approaches. Additionally, the occurrence of a misfire event for a corresponding cylinder can sometimes cause transients within the engine or vehicle which in turn may be sensed and detected as false misfires.

It is therefore one object of the present invention to provide for an improved apparatus and method of detecting cylinder misfires in an internal combustion engine.

It is another object of the present invention to provide for a misfire detection apparatus and method which is capable of detecting cylinder misfires for an internal combustion engine and which is capable of filtering out unwanted noise caused by engine transients to thereby reduce possible false engine misfire reports.

It is yet another object of the present invention to provide for a misfire detection apparatus and method which reduces the noise effects that can be caused by the occurrence of a misfire event.

It is a further object of the present invention to provide for a misfire detection apparatus and method which compensates for normal engine accelerations, and realizes a good signal to noise ratio.

SUMMARY OF THE INVENTION

To achieve the foregoing objectives, the present invention is an apparatus and method for detecting misfire in cylinders of an internal combustion engine of a motor vehicle. The apparatus and method of the present invention are advantageously capable of detecting cylinder misfires with good signal to noise ratio and capable of distinguishing misfires from noise related events such as misfire induced bobble and harsh clutching maneuvers. Crankshaft rotation is sensed and crankshaft velocities are measured for each cylinder. Changes in angular velocity are determined and correspond to each of a plurality of cylinder firing events. The apparatus of the present invention includes at least a first averaging filter cascade connected to a second averaging filter. With the first averaging filter, angular velocity changes are sorted over a predetermined series of cylinder firings and the two middle angular velocity changes are averaged to provide an average change in velocity value. A deviation is determined between the average change in velocity and the current change in velocity for a selected cylinder. With the second averaging filter, deviations from the first averaging filter are sorted over a series of cylinder firings and the two middle deviations are averaged to provide an average change in the first deviation. A second deviation is determined between the change in the first deviation for a selected cylinder and the average deviation value. The second deviation is compared to a threshold value and a misfire event is determined for the selected cylinder based on the comparison. Additional cascade connected averaging filters may be employed to generate an output which is compared with the threshold value to determine the occurrence of a misfire event.

BRIEF DESCRIPTION OF THE DRAWINGS

Other objects and advantages of the present invention will become apparent to those skilled in the art upon reading the following detailed description and upon reference to the drawings in which:

FIG. 8 is a three-dimensional mapped surface illustrating an example of RPMLOW threshold values for use in the present invention;

FIGS. 9a–9c illustrate an example of event data taken during a misfire induced bobble condition; FIGS. 10a–10c illustrate event data taken during a harsh clutch maneuver absent any misfire event.

DETAILED DESCRIPTION OF THE PREFERRED EMBODIMENTS

Figure 1:
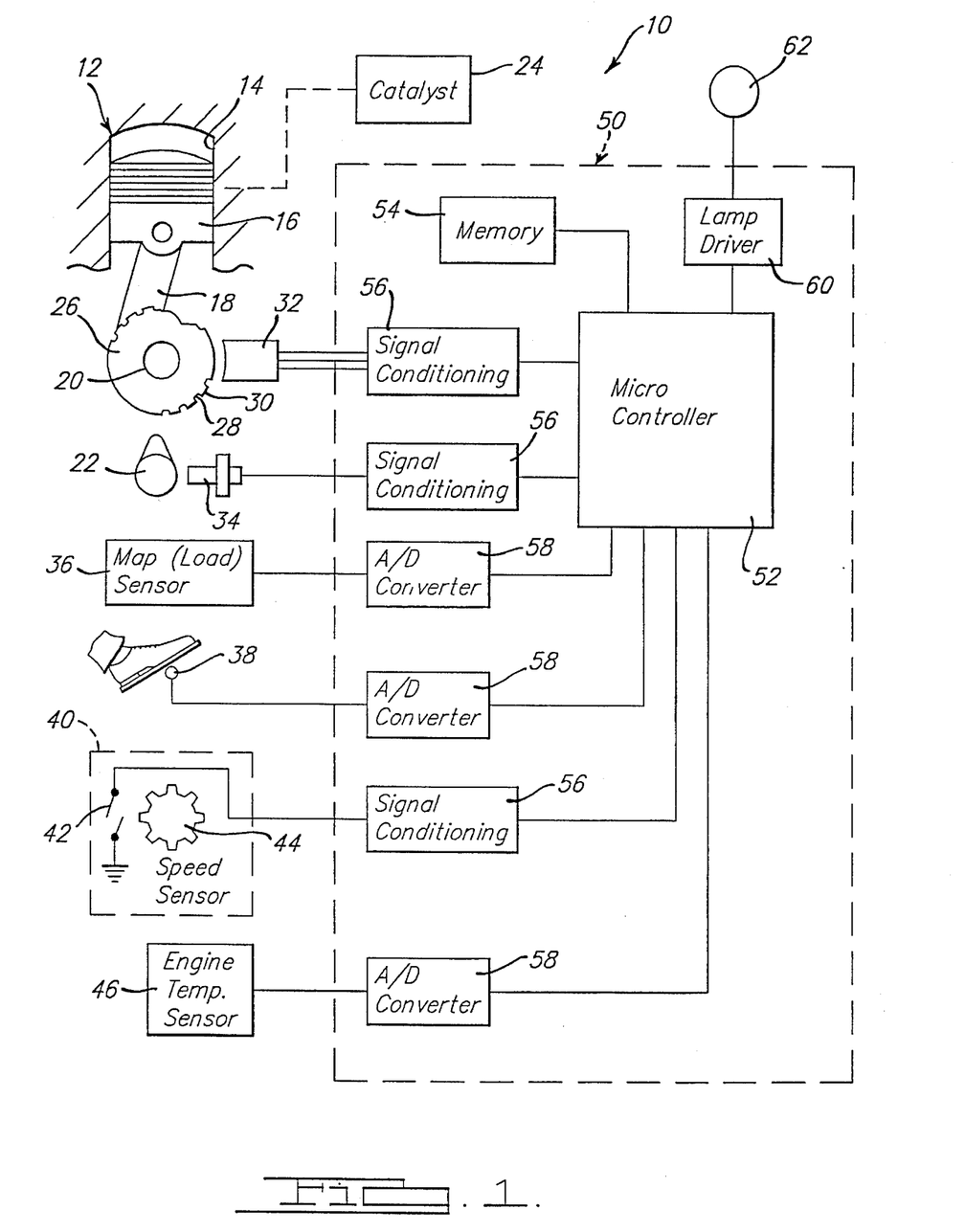
FIG. 1 is an overall block diagram illustrating a misfire detection apparatus according to the present invention.

Turning now to FIG. 1, an overall block diagram illustrating the misfire detection apparatus 10 according to the present invention is shown therein. The misfire detection apparatus 10 is used on an internal combustion engine indicated by reference numeral 12, of a motor vehicle (not shown). A partial cut-away view of engine 12 is shown illustrating one of a multiple of cylinders 14 in the engine 12. As illustrated, a piston 16 is disposed in the cylinder 14 and is operatively connected by a connecting rod 18 to a crankshaft 20. A camshaft 22 is used to open and close at least one valve (not shown) of the cylinder 14 for various strokes of the piston 16. The piston 16 is illustrated in the expansion (power) stroke of a four stroke engine. In such a four stroke engine, the strokes include intake, compression, expansion (power), and exhaust. During the exhaust stroke, exhaust gases flow from the cylinder 14 via at least one valve and through the exhaust system (not shown). Although the preferred embodiment of apparatus 10 shows a four stroke engine, the apparatus 10 can also be applied to other internal combustion engines, such as a two stroke engine. It should also be appreciated that the apparatus 10 can also be applied to any spark-ignited or diesel engine. It should be appreciated that a spark plug is present in the preferred embodiment, although it is not illustrated herein. Additionally, a catalyst 24 of a catalytic converter (not shown) is illustrated pictorially as part of the exhaust system.

The misfire detection apparatus 10 further includes a sensor target 26 operatively connected to the crankshaft 20. The sensor target 26 has at least one, and preferably a plurality of trip points, which in the preferred embodiment are provided as slots 28, formed by teeth 30. The apparatus 10 also includes a crankshaft sensor 32 for communication with the sensor target 26 and a camshaft sensor 34 in communication with the camshaft 22. The misfire detection apparatus 10 further includes a manifold absolute pressure (MAP) sensor 36, throttle sensor 38, a vehicle speed sensor 40 and an engine temperature sensor 46. The outputs of the sensors 36, 38, 40 and 46 communicate with an engine control unit, generally indicated by 50.

The engine control unit 50 includes a microcontroller 52, memory 54, signal conditioning circuitry 56 and analog-to-digital (A/D) converters 58 to process outputs from the various sensors according to the misfire detection methodology to be described hereinafter. In the preferred embodiment, the outputs of crankshaft sensor 32, camshaft sensor 34, and vehicle speed sensor 40 communicate with the microcontroller 52 via appropriate signal conditioning circuitry 56 which is particularized to the type of sensor employed. The output of the MAP sensor 36, throttle position sensor 38 and engine temperature sensor 46 communicate with the microcontroller 52 via the A/D converters 58. The engine control unit 50 also includes a lamp driver 60, which takes the output of the microcontroller 52 and drives an output display such as an indicator light or driver warning lamp 62. Memory 54 is a generic memory which may include Random Access Memory (RAM), Read Only Memory (ROM) or other appropriate memory. It should also be appreciated that the engine control unit 50 also includes various timers, counters and like components for the misfire detection methodology of the present invention.

Figure 2:
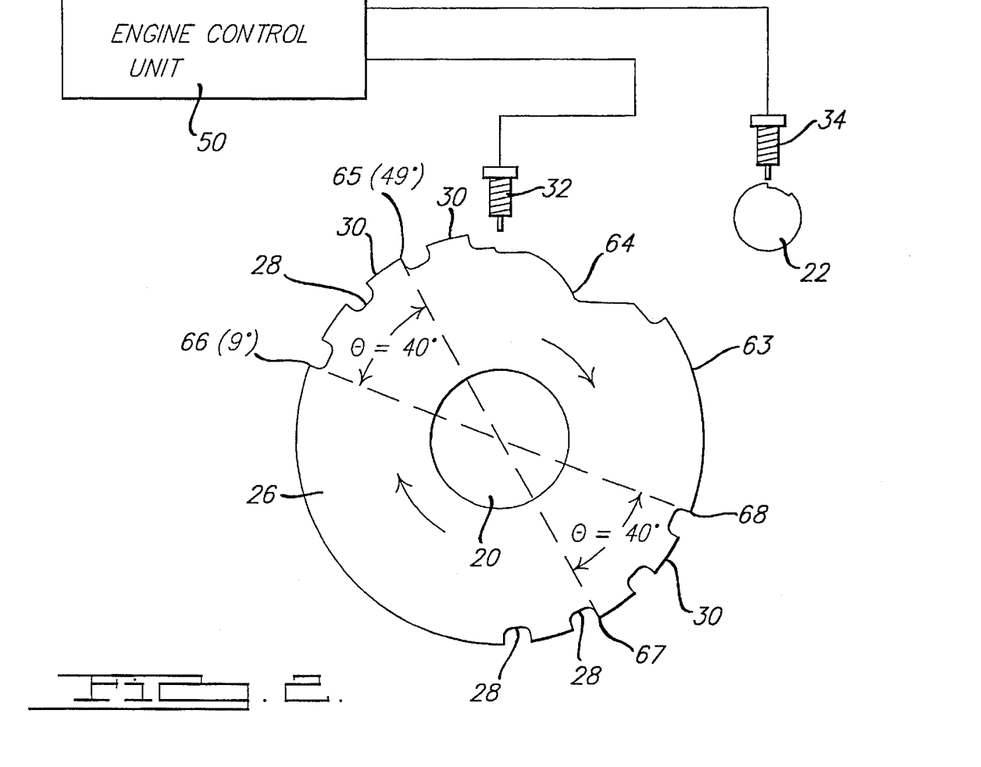
FIG. 2 is a pictorial diagram illustrating an engine crankshaft and camshaft for providing measurements for use with the misfire detection apparatus of FIG. 1.

Referring to FIG. 2, a pictorial diagram illustrating the crankshaft 20, camshaft 22, sensor target 26, crankshaft sensor 32 and camshaft sensor 34 in communication with the engine control unit 50 is provided for the misfire detection methodology. According to one embodiment, the sensor target 26 is formed by slots 28 which are cut into a counterweight 63. The counterweight 63 is attached to or incorporated on a pulley or wheel (not shown) such as by welding, although other suitable means may be employed to securely fasten the counterweight 63 to the wheel. The wheel, in turn, is affixed to and driven by the crankshaft 20.

According to one embodiment of a four-cylinder engine, the engine 12 has four cylinders 14 oriented into a straight line configuration, resulting in a one hundred eighty degree (180°) expansion stroke for each cylinder 14. The firing order for the four cylinders 14 is 1 3 4 2. Crankshaft velocity measurements are taken by measuring the amount of time expired over an angular displacement θ for a forty degree (40°) interval of the expansion stroke for each cylinder 14 of the engine 12. Preferably, the forty degree (40°) interval is near the end of the expansion stroke. As illustrated in FIG. 2, a signature slot 64 is cut into the counterweight 63 such that a first edge 65 is a forty-nine degree (49°) edge. At least one slot 28 is cut in the counterweight 63 after the first edge 65 has formed a second edge 68 at a nine degree (9°) edge. Other slots 28 may also be cut in the counterweight 63 between the first and second edges 65 and 66 for use for ignition timing or other purposes. It should be appreciated that the first edge 65 identifies the starting location for measuring velocity corresponding to cylinder numbers 1 and 4 of the cylinders 14.

The sensor target 26 includes at least two other slots 28 to form a third edge 67 and a fourth edge 68 opposite or one hundred eighty degrees (180°) from the first edge 65 and second edge 66, respectively. Optionally, other slots 28 may also be cut in the counterweight 63 between the third and fourth edges 67 and 68 for use for ignition timing or other purposes. It should be appreciated that the third edge 67 identifies the starting location for measuring velocity corresponding to cylinder numbers 3 and 2 of the cylinders 14. It should also be appreciated that the third edge 67 is a forty-nine degree (49°) edge and the fourth edge 68 is a nine degree (9°) edge.

According to another embodiment, a six-cylinder engine has six cylinders in an overlapping configuration resulting in a one-hundred-twenty degree (120°) expansion stroke for each cylinder 14 of engine 12. For the six-cylinder engine, crankshaft velocity measurements are preferably taken over an angular displacement θ for a sixty degree (60°) interval of the expansion stroke. The sixty degree (60°) interval is measured from a sixty-nine degree (69°) edge and a nine degree (9°) edge. While four-cylinder and six-cylinder engines are described herein, it should be appreciated that the present invention applies to various other size multi-cylinder engines and other various overlapping cylinder configurations.

The crankshaft sensor 32 is used to measure position markings, namely edges 65–68, for use in determining crankshaft velocity. The crankshaft sensor 32 is mounted near the sensor target 26 and located so that when aligned with edges 66 and 68, a falling edge will occur nine degrees (9°) before piston top dead center (TDC). In one embodiment, the crankshaft sensor 32 may be a hall effect sensor. It should also be appreciated that other sensors such as optical sensors or variable reluctance sensors may also be used according to other embodiments.

The camshaft sensor 34 is used to identify specific cylinder firings. Since the camshaft 22 rotates 360° for every 720° of rotation of crankshaft 20, identification of a given cylinder can be determined. Such identification will assist in pinpointing exactly what cylinder or cylinders are misfiring. Although the preferred embodiment uses a crankshaft position marking and cam sensor and algorithm to determine top dead center (TDC) of the number 1 cylinder, cylinder identification techniques may vary with different engines. It should also be understood that the camshaft sensor 34 and camshaft 25 are conventional components generally known in the art.

Figure 3:
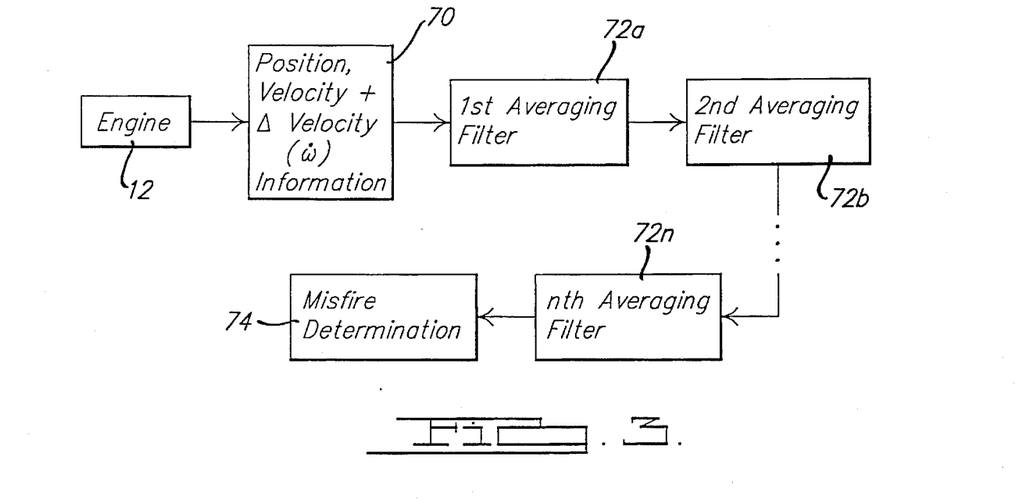
FIG. 3 is a block diagram illustrating the general concept of misfire detection according to the present invention.

Turning to FIG. 3, a general illustration of the misfire detection apparatus of the present invention is presented therein. Engine crankshaft position, velocity and velocity change information 70 is determined from engine parameters output from engine 12. The crankshaft position, velocity and velocity change information 70 is used to provide a misfire determination 74 for a corresponding engine cylinder. According to the present invention, information 70 is processed by a plurality of cascade configured averaging filters 72a, 72b, . . . , 72n. More specifically, a first averaging filter 72a receives and processes information 70. A second averaging filter 72b receives an output from the first averaging filter 72a and likewise processes information associated therewith. According to one preferred embodiment of the present invention, two averaging filters 72a and 72b are employed and discussed hereinafter. However, the present invention is applicable to n averaging filters, where n is a number of two or more.

Figure 4:
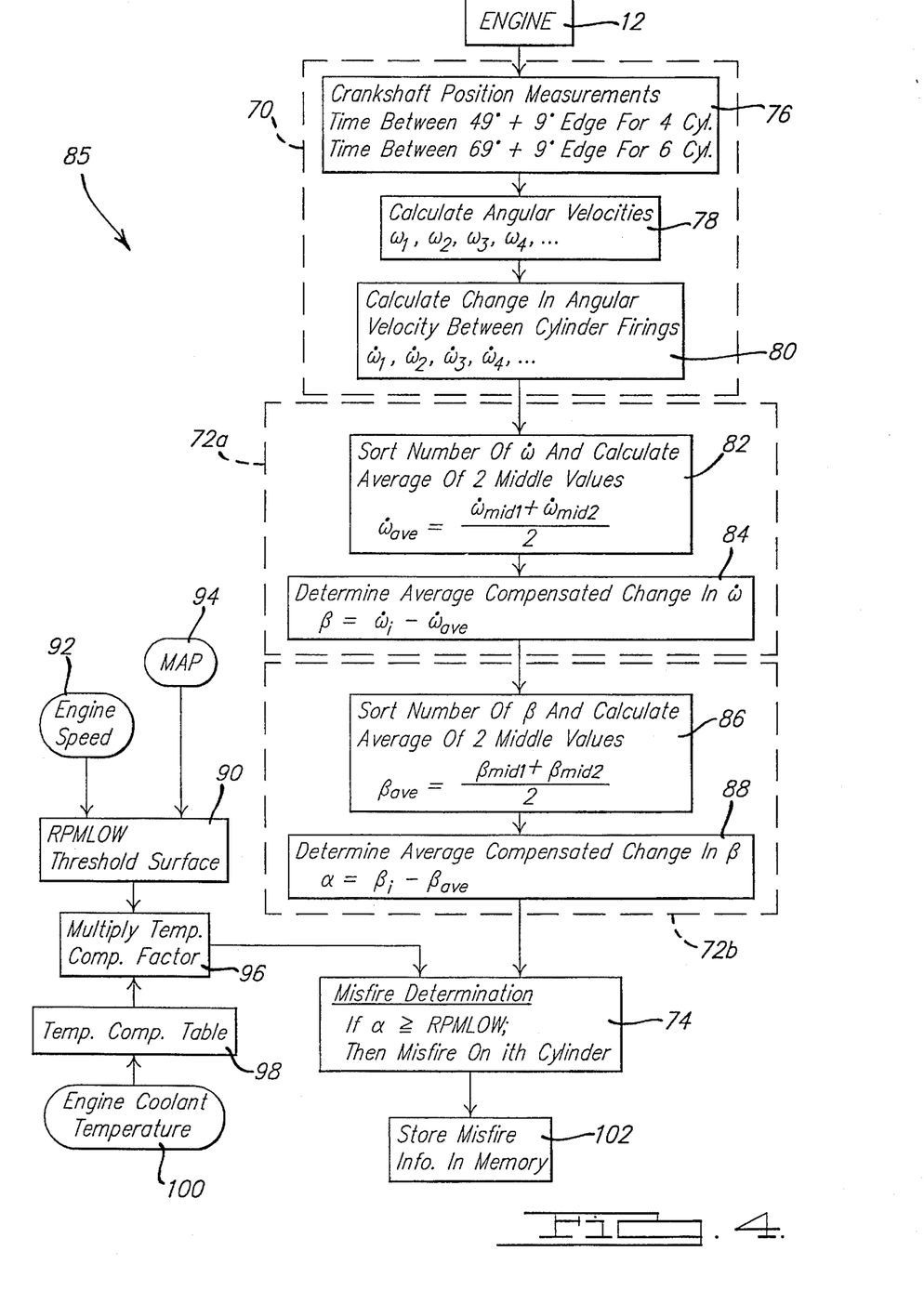
FIG. 4 is a detailed flow chart illustrating the overall methodology for detecting cylinder misfires in a multi-cylinder engine according to the present invention.

With particular reference to FIG. 4, a flow chart illustrating the overall method 85 for detecting cylinder misfires of engine 12 is shown therein according to the present invention. The misfire detection methodology 85 generally begins at block 76. During operation of engine 12, crankshaft position measurements are taken over a predefined angular displacement θ of the crankshaft 20 during an expected cylinder firing for each cylinder 14 of engine 12. The position measurements are preferably obtained by measuring a time interval (T) expired during rotation of the crankshaft 20 through the predefined angular displacement θ. This accomplished by microcontroller 52 starting a timer when crankshaft sensor 32 detects first edge 65 for a four-cylinder engine. For the four-cylinder engine application, the timer is stopped after a forty degree (40°) rotation when sensor 32 detects second edge 66. For the next cylinder firing, a timer is likewise started when crankshaft sensor 32 detects the third edge 67 and is stopped after a forty degree (40°) rotation when sensor 32 detects fourth edge 68. For a six-cylinder engine application, the timer measurements are taken over a sixty degree (60°) angular rotation interval.

The methodology advances to step 78 in which each of the time intervals (T) measured by the microcontroller 52 are used by the microcontroller 52 to calculate an angular velocity (RPM) value ω of the crankshaft for the corresponding cylinder. This is generally accomplished by dividing the angular displacement θ by the corresponding time (T) measurement. The position time measurements and angular velocity calculations are continually repeated for each cylinder firing event to obtain a series of angular velocities $\omega_1, \omega_2, \omega_3, \omega_4, \omega_5, \omega_6, \ldots$, etc. corresponding to respective cylinders 1, 3, 4, 2, 1, 3, . . . , for example.

The misfire detection methodology 85 proceeds to step 80 in which microcontroller 52 calculates changes in angular velocity (ω̇) which correspond to each expected cylinder firing event. The change in angular velocity for a current cylinder (i) is calculated by determining the difference between angular velocity for the current cylinder (i) and the following successive cylinder (i+1). The calculated changes in angular velocity are represented by $\dot{\omega}_1, \dot{\omega}_2, \dot{\omega}_3, \dot{\omega}_4$, etc. The angular velocity changes ω̇ are continually calculated from one cylinder firing event to another and may be accumulated and a consecutive series of angular velocity changes can abe saved in memory 54 or calculated from stored velocity information ω.

Figure 5:
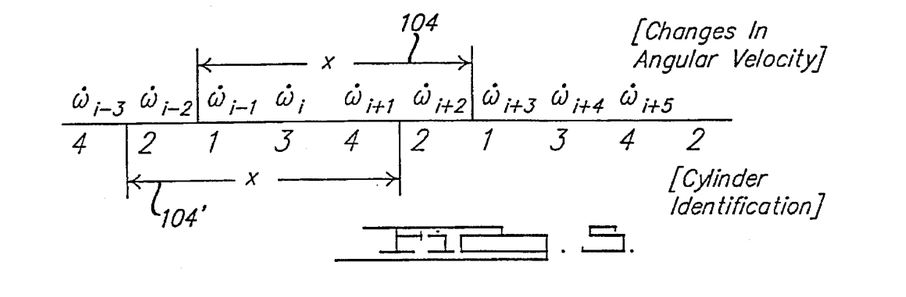
FIG. 5 illustrates a series of changes in angular velocity measurements as selected for a four-cylinder engine.
Figure 6:
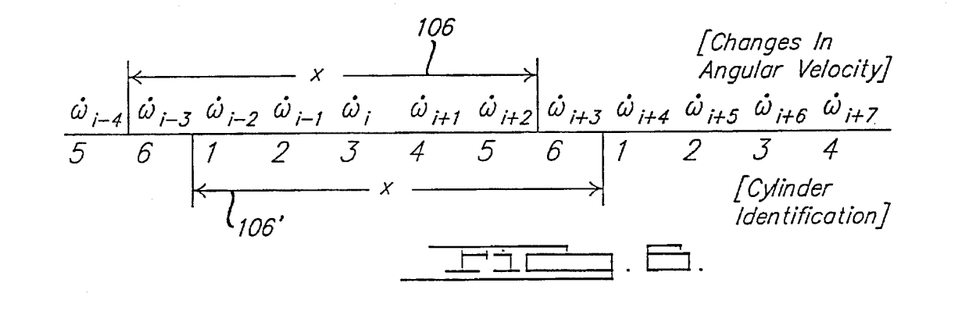
FIG. 6 illustrates a series of changes in angular velocity measurements as selected for a six-cylinder engine.

The angular velocity changes ω̇ are applied to the first averaging filter 72a which, according to the methodology 85, generally includes steps 82 and 84. In step 82, a series of angular velocity changes $\dot\omega$ are first sorted. Turning to FIGS. 5 and 6, a continuous series of consecutive changes in angular velocity $\dot\omega$ are shown for a four-cylinder engine provided in FIG. 5 and a six-cylinder engine provided in FIG. 6. Referring to the four-cylinder engine of FIG. 5, a continuous series of consecutive changes in angular velocity $\dot\omega_{i-3}, \dot\omega_{i-2}, \dot\omega_{i-1}, \dot\omega_i, \dot\omega_{i+1}, \dot\omega_{i+2}, \dot\omega_{i+3}, \dot\omega_{i+4}, \dot\omega_{i+5}$ are shown for respective cylinder firing events corresponding to cylinders 4 2 1 3 4 2 1 3 4. According to the present invention, a window containing a series 104 of consecutive angular velocity changes is selected. This selected series 104 includes the current change in angular velocity $\dot\omega_i$ for the current cylinder firing event (i) and adjacent changes in angular velocity. According to one embodiment, the misfire detection methodology 85 preferably selects a series 104 of X=4 angular velocity changes which includes the angular velocity changes for the current cylinder firing event $\dot\omega_i$, the single previous cylinder firing event $\dot\omega_{i-1}$, and the two successive following cylinder firing events $\dot\omega_{i+1}$ and $\dot\omega_{i+2}$. According to an alternate embodiment, a series 104' of selected changes in angular velocity correspond to the two previous cylinder firing events $\dot\omega_{i-2}$ and $\dot\omega_{i-1}$, the current cylinder firing event $\dot\omega_i$ and the following cylinder firing event $\dot\omega_{i+1}$.

According to the six-cylinder arrangement as shown in FIG. 6, a window containing a series 106 of six consecutive angular velocity changes is similarly selected from a continuous series of calculated angular velocity changes. According to one preferred embodiment, the series 106 includes the current change in angular velocity $\dot\omega_i$ for cylinder firing event (i), the three previous consecutive cylinder firing events $\dot\omega_{i-3}, \dot\omega_{i-2}$ and $\dot\omega_{i-1}$, and the following two cylinder firing events $\dot\omega_{i+1}$ and $\dot\omega_{i+2}$. According to an alternate embodiment for the six-cylinder arrangement, the selected series 106' includes the previous two cylinder firings as shown by $\dot\omega_{i-2}$ and $\dot\omega_{i-1}$, the current cylinder firing event $\dot\omega_i$ and the following three cylinder firing events $\dot\omega_{i+1}, \dot\omega_{i+2}$ and $\dot\omega_{i+3}$.

Accordingly, a series 104 or 104' of four changes in angular velocity corresponding to four consecutive cylinder firing events are selected for a four-cylinder engine, while a series 106 or 106' of six velocity changes corresponding to six cylinder firing events are measured for a six-cylinder engine. In either case, the window containing the series of selected angular velocity changes includes velocity changes corresponding to the current cylinder of interest and adjacent cylinders. It is preferred that the series has an even number of selected angular velocity changes $\dot\omega$. It is also preferred that the number of selected velocity changes $\dot\omega$ be equal to the number of cylinders in the engine of interest.

Referring back to FIG. 4, the selected changes in angular velocity are sorted by amplitude as provided in step 82 of the misfire detection methodology 85. Of the sorted changes in angular velocity, the middle two values $\dot\omega_{mid1}$ and $\dot\omega_{mid2}$ are chosen and are used to calculate an average change in angular velocity $\dot\omega_{ave}$. This is accomplished by dividing in half the sum of the two middle values $\dot\omega_{mid1}$ and $\dot\omega_{mid2}$. The average change in angular velocity $\dot\omega_{ave}$ is continually calculated for each cylinder firing event.

Next, an average compensated change in angular velocity change is determined as shown in step 84. This is accomplished by comparing the current change in angular velocity $\dot\omega_i$ with the average angular velocity change $\dot\omega_{ave}$ to determine the average compensated change in the angular velocity change as represented by $\beta$. Preferably, the average compensated value $\beta$ is determined by subtracting the average angular velocity change $\dot\omega_{ave}$ from the current angular velocity change $\dot\omega_i$. The average compensated change in angular velocity change $\beta$ is output from the first averaging filter 72a and applied to the second averaging filter 72b.

Figure 7:
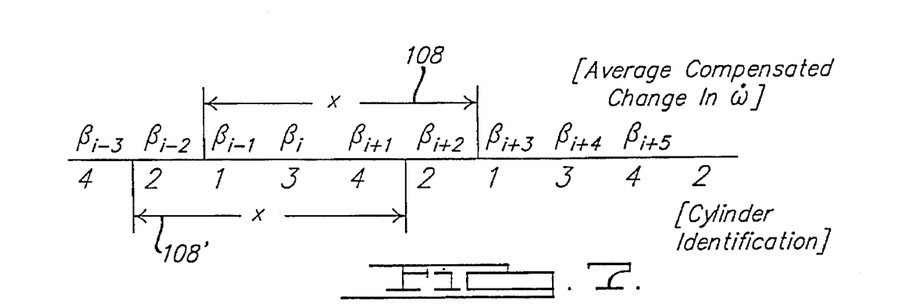
FIG. 7 illustrates a series of changes in average compensated values β as selected for a four-cylinder engine.

The second averaging filter 72b according to the methodology 85 generally includes steps 86 and 88. According to step 86, a series of average compensated change in angular velocity changes (i.e., average compensated values) $\beta$ are sorted and an average of two middle values from a selected series is calculated. Turning momentarily to FIG. 7, a continuous series of consecutive changes in average compensated values $\beta$ are shown for a four-cylinder engine. A continuous series of consecutive average compensated values $\beta_{i-3}, \beta_{i-2}, \beta_{i-1}, \beta_i, \beta_{i+1}, \beta_{i+2}, \beta_{i+3}, \beta_{i+4}$ and $\beta_{i+5}$, are shown for respective cylinder firing events corresponding to cylinders 4 2 1 3 4 2 1 3 4. According to the present invention, a window containing a series 108 of consecutive average compensated values $\beta$ is selected. This selected series 108 includes a current change in average compensated value $\beta_i$ for the current cylinder firing event (i) and adjacent average compensated values. According to one embodiment, the misfire detection methodology 85 preferably selects a series 108 of X=4 average compensated values which includes the average compensated value for the current cylinder $\beta_i$, the single previous cylinder firing event $\beta_{i-1}$ and the two successive following cylinder firing events $\beta_{i+1}$ and $\beta_{i+2}$. According to an alternate embodiment, the selected series 108' of selected average compensated values contains values corresponding to the two previous cylinder firing events $\beta_{i-2}$ and $\beta_{i-1}$, the current cylinder firing event $\beta_i$ and the following cylinder firing event $\beta_{i+1}$. According to a six-cylinder arrangement, the window would preferably contain a series of six consecutive average compensated values $\beta$ similarly selected from a continuous series of average compensated values.

It should be appreciated that the selection of average compensated values $\beta$ similarly corresponds to the selection of the angular velocity changes $\dot\omega$ as shown and described in connection with FIGS. 5 and 6 for use in the first averaging filter 72a. It is preferred that the series contains an even number of average compensated values $\beta$. It is also preferred that the number of average compensated values $\beta$ selected in the series be equal to the number of cylinders in the engine of interest.

Referring again to FIG. 4, the selected average compensated values $\beta$ are sorted by amplitude as provided in step 86 of the misfire detection methodology 85. Of the sorted average compensated values $\beta$, the middle two sorted values $\beta_{mid1}$ and $\beta_{mid2}$ are chosen and are used to calculate an average compensated change in the average compensated value $\beta$ which is represented by $\beta_{ave}$. The average value $\beta_{ave}$ determined in step 86 is preferably calculated by dividing in half the sum of the two middle values $\beta_{mid1}$ and $\beta_{mid2}$. The average value $\beta_{ave}$ is continually calculated for each cylinder firing event.

Next, the second averaging filter 72b, according to the methodology 85, determines an average compensated change in the average compensated value $\beta$ as represented by $\alpha$ shown in step 88. This is accomplished by comparing the current average compensated value $\beta_i$ with the average value $\beta_{ave}$ to determine the average compensated value $\alpha$. Preferably, the average compensated value $\alpha$ is determined by subtracting the average value $\beta_{ave}$ from the current average compensated value $\beta_i$. The average compensated value $\alpha$ is output from the second averaging filter 72b and used for providing a determination of misfire detection in the current cylinder (i) as will be explained in connection with step 74.

The average compensated value $\alpha$ is used to determine whether or not a misfire occurred for the current cylinder (i) as provided in step 74 of the methodology 85. More particularly, the average compensated value $\alpha$ is compared with a predetermined threshold value (RPMLOW) to determine if a misfire has been detected. The predetermined threshold value (RPMLOW) is retrieved from a threshold surface 90 of information stored in memory or a state machine. Threshold value RPMLOW is a function of engine speed, changes in engine speed and manifold pressure (MAP) which is looked up in the mapped surface 90. Referring momentarily to FIG. 8, an example of a RPMLOW threshold surface 90 is provided therein. The RPMLOW threshold value as provided by value 110 is determined by looking up the current engine speed, calculated change in engine speed and manifold pressure as presented during the misfire determination for the current cylinder firing event. Accordingly, engine speed 92 is monitored as well as manifold pressure (MAP) 94, while microcontroller 52 determines changes in engine speed.

Additionally, the selected RPMLOW threshold value may optionally be multiplied by a temperature compensation factor 96 in order to compensate for a cold engine condition. In doing so, current engine temperature 100 is measured and a temperature compensation factor is looked up in a temperature compensation table 98. This compensation table factor is then multiplied by the selected RPMLOW threshold value in step 96 and the compensated value is used as the comparison threshold value RPMLOW for misfire determination according to step 74.

When a misfire event is detected, the cylinder 14 is identified by the camshaft sensor 34 and the crankshaft 32 and the cylinder misfire information is stored in memory 54 according to step 102. The accumulated misfire information may be retrieved and used to determine the cause of an engine problem. Additionally, the number of misfires may be evaluated by the microcontroller 52 to determine whether a given rate of misfire would cause premature failure of the catalyst 24. If catalyst failure is indicated, the cylinder number or identification may be recorded by microcontroller 52 and the driver warning lamp 62 can be illuminated by the lamp driver 60. Nonetheless, the driver warning lamp 62 can be illuminated to indicate one or more misfire events.

The misfire detection apparatus and methodology of the present invention advantageously is operable to detect misfire events, while able to discriminate between actual misfires and noise related events. Accordingly, noise commonly associated with engine transients such as harsh shifting of a manual transmission can advantageously be filtered out with the use of a plurality of cascade configured averaging filters according to the present invention. Furthermore, misfire induced noise may likewise be eliminated as possible misfire events and improved signal to noise ratio may be achieved.

Figure 9A:
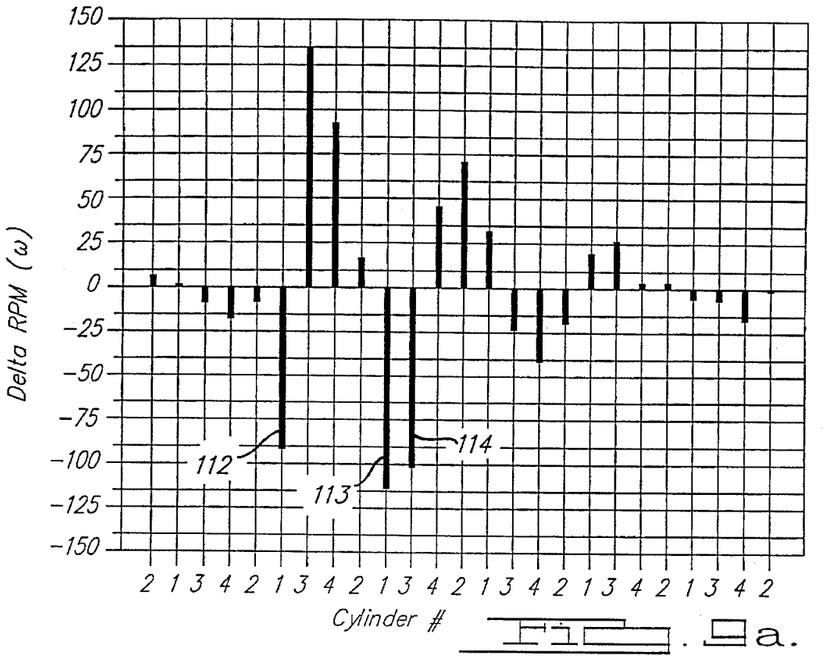
FIG. 9a shows measured changes in angular velocity.
Figure 9B:
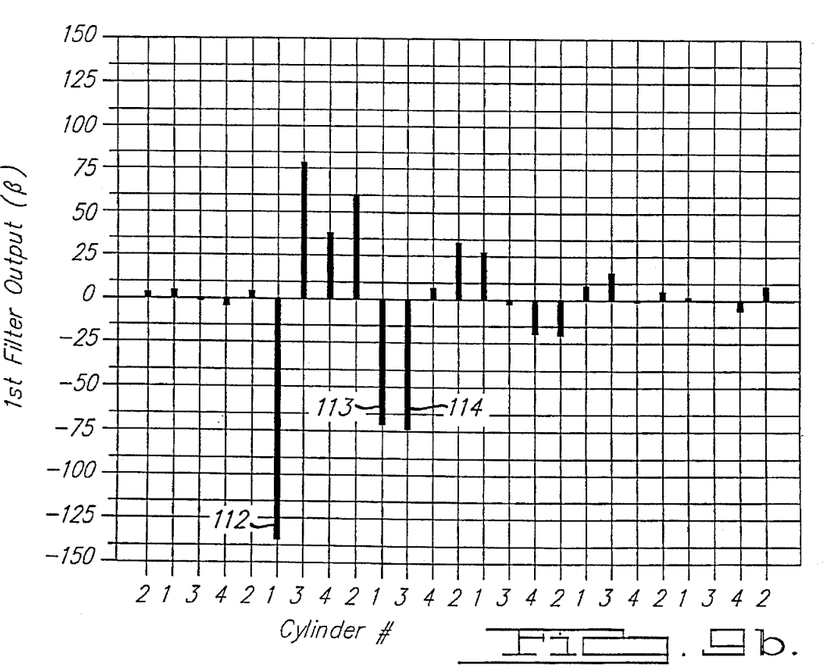
FIG. 9b shows calculated outputs from a first averaging filter.
Figure 9C:
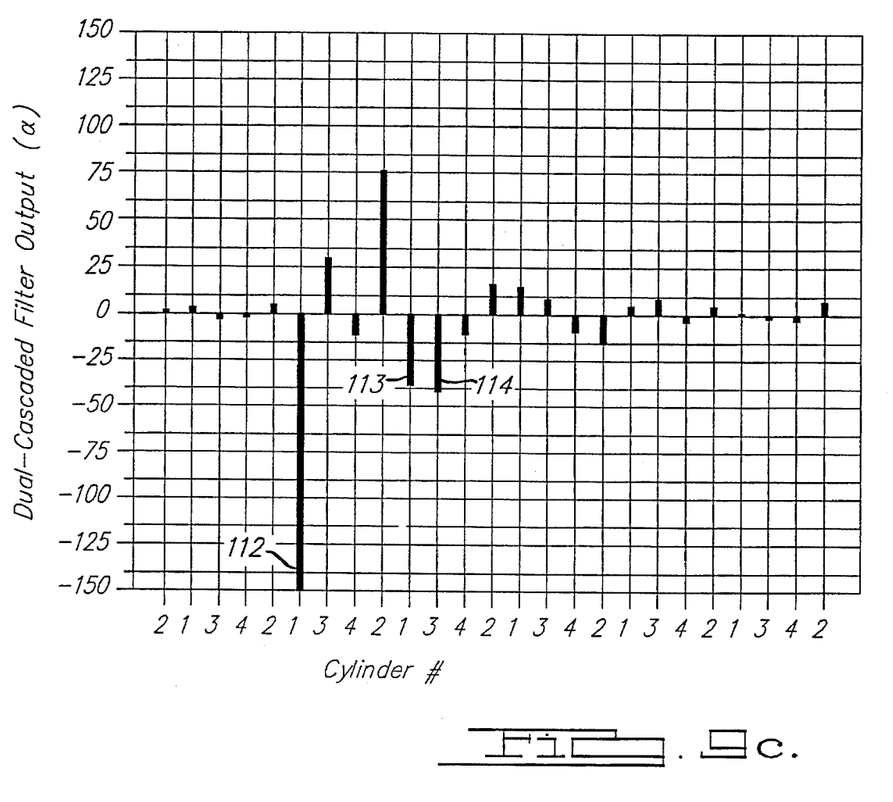
FIG. 9c shows outputs from a second averaging filter for detecting cylinder misfires with the novel misfire detection of the present invention.

Examples of event data taken from a four-cylinder engine during a misfire induced bobble condition and then during a harsh clutch maneuver is illustrated and will now be described in connection with FIGS. 9a–9c and 10a–10c. The event data provided in FIGS. 9a–9c was taken during the misfire induced bobble condition in which a misfire occurring at certain engine speeds and loads further causes ensuing torsional forces in the crankshaft generally where the crankshaft velocity information is taken. As a result, the event data will tend to look like a higher rate of misfires then what actually occurred, thereby providing false misfire reports with many conventional misfire detection approaches. With particular reference to FIG. 9a, a misfire occurs on cylinder number 1 whereby a negative angular velocity change $\omega$ results as shown by reference numerals 112. As previously mentioned, the occurrence of a misfire will generally cause a decrease in the angular velocity and velocity change. However, due to the aforementioned torsional forces in the crankshaft, a large negative angular velocity change $\omega$ occurs on the second occurrence of cylinder 1 and also on the occurrence of cylinder 3 as shown by reference numerals 113 and 114, respectively. The first averaging filter output $\beta$, as shown in FIG. 9b, partially distinguishes the misfire event occurring on cylinder 1 from the bobble induced effects 113 and 114 on the following cylinder 1 and cylinder 3, respectively. Turning to FIG. 9c, the dual-cascaded averaging filter output $\alpha$ clearly distinguishes the misfire event 112 on cylinder 1 from the bobble induced data 113 and 114. Accordingly, the present invention advantageously filters out bobble induced noise which may otherwise cause a false misfire report. It should be appreciated that three or more cascaded averaging filters could further distinguish actual misfire events from bobble disable induced events.

Figure 10A:
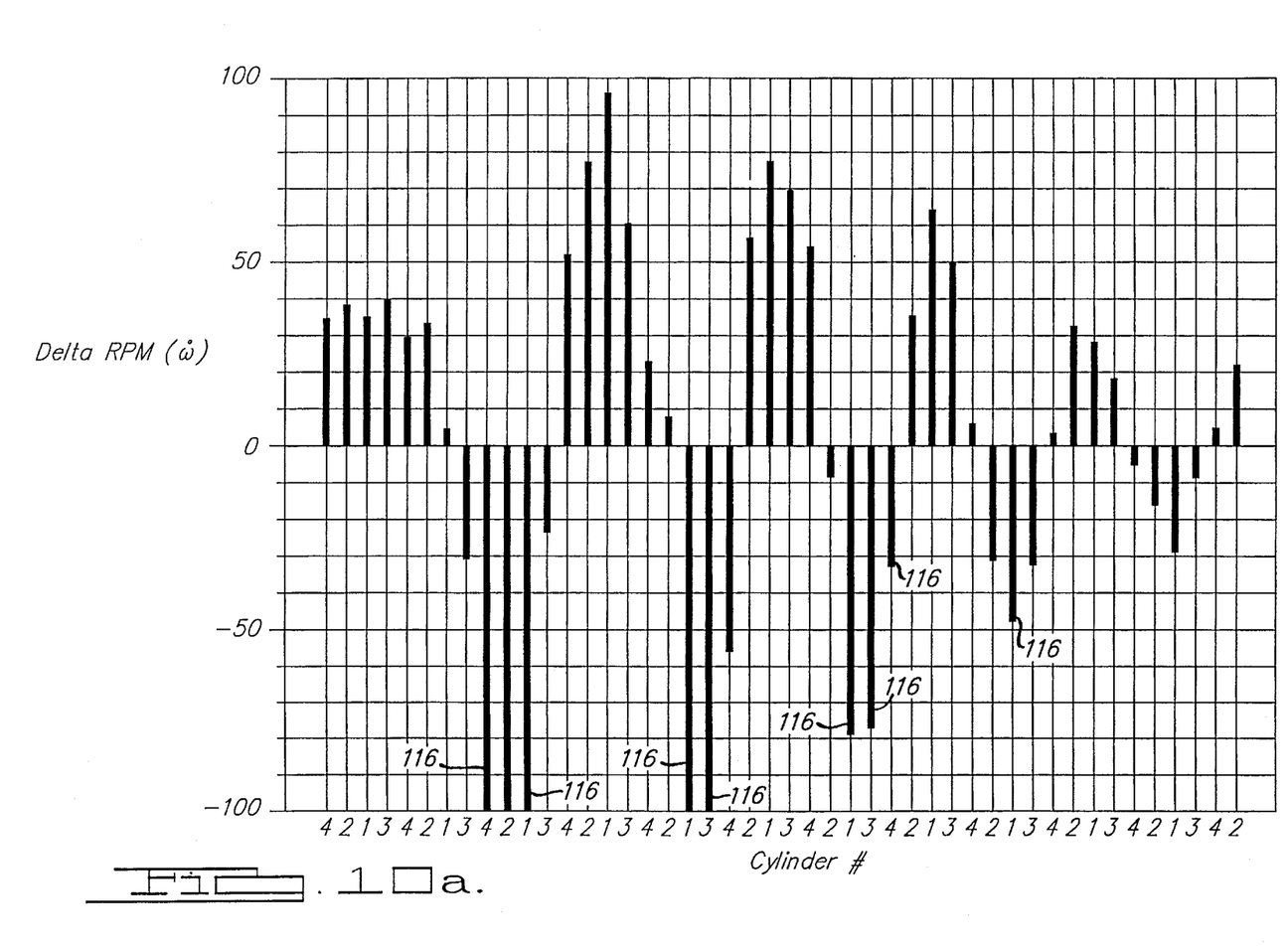
FIG. 10a shows measured changes in angular velocity.
Figure 10B:
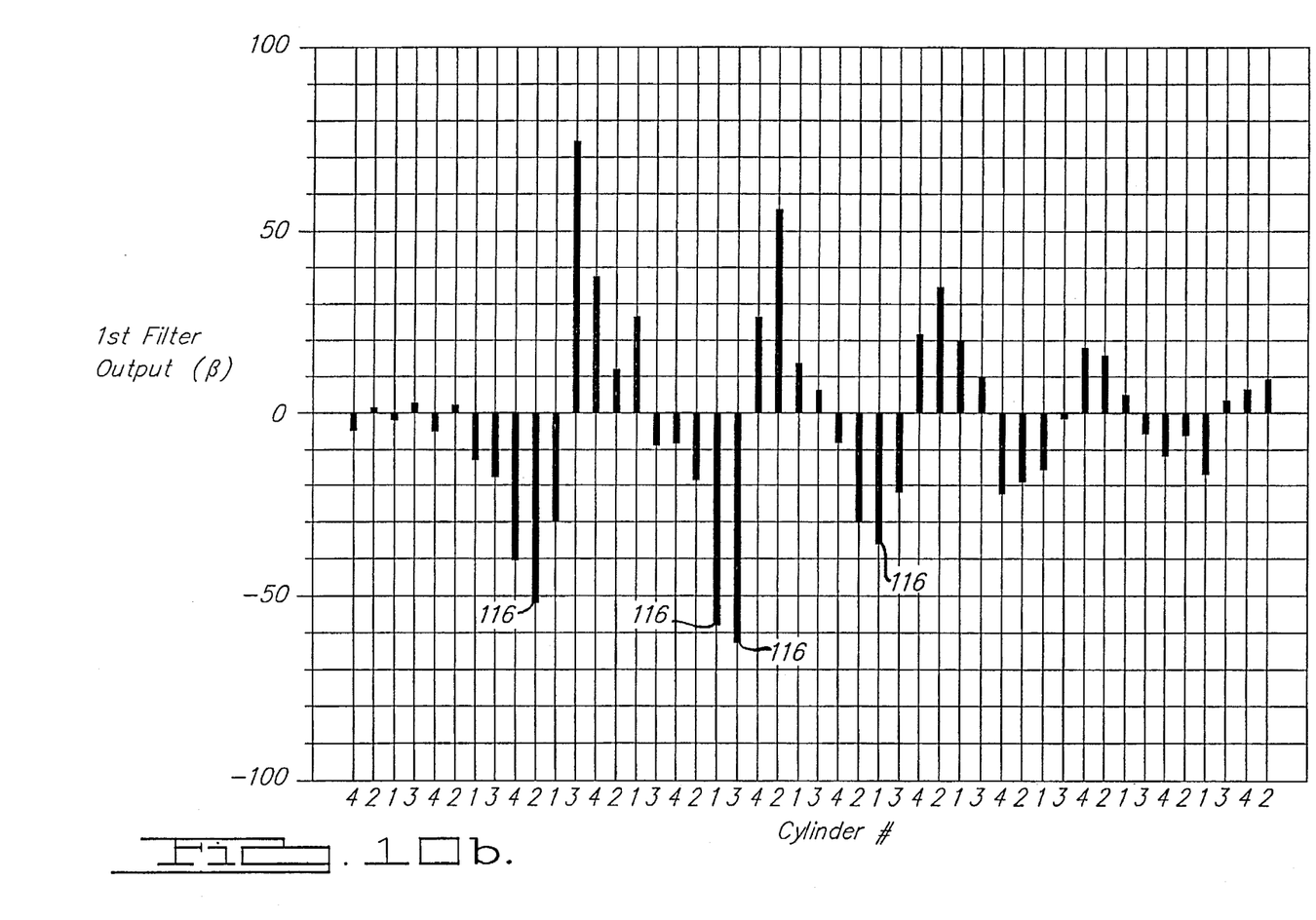
FIG. 10b shows outputs from the first averaging filter.
Figure 10C:
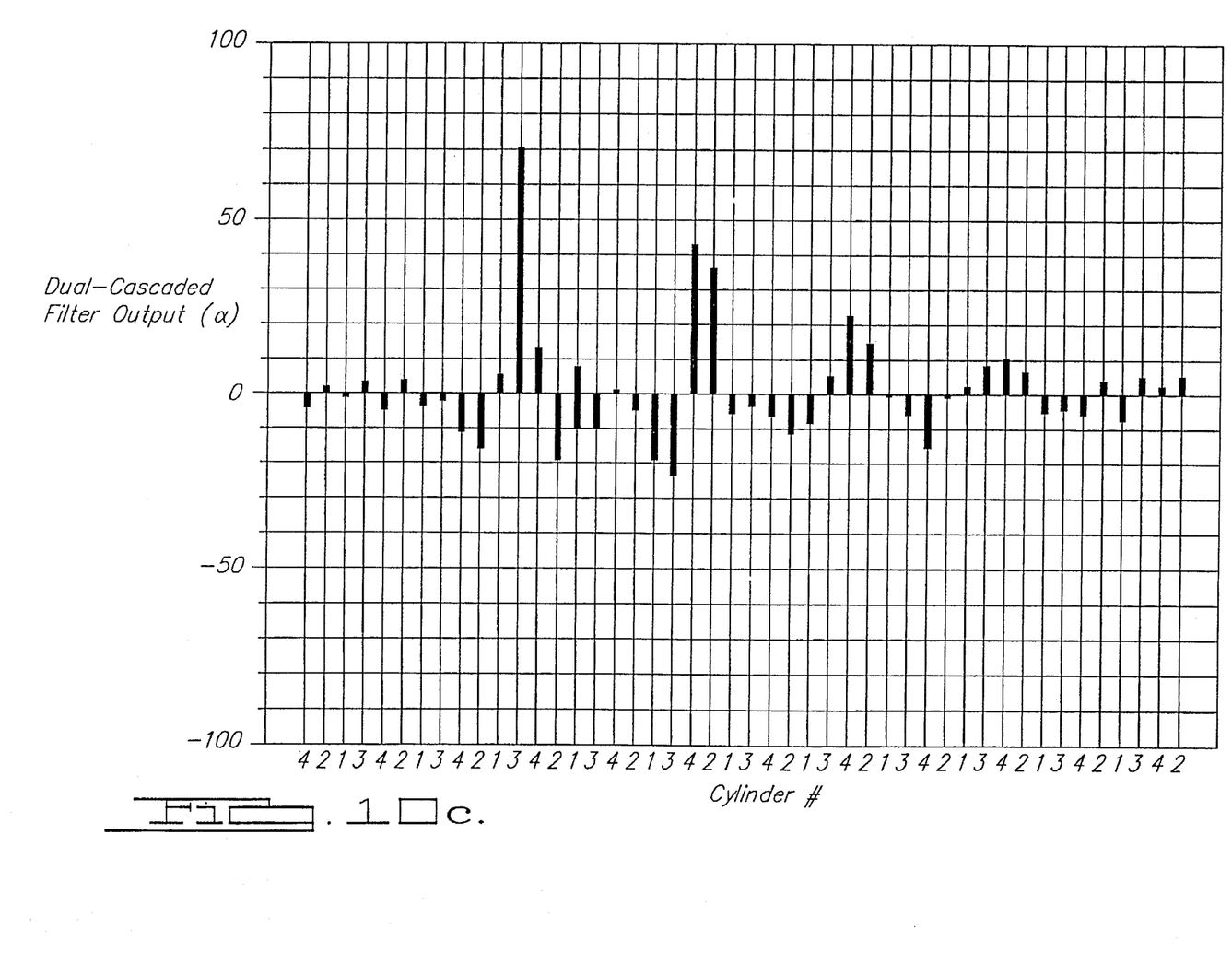
FIG. 10c shows outputs from the second averaging filter for detecting cylinder misfires with the novel misfire detection of the present invention.

Finally, turning to FIGS. 10a–10c, event data is shown for a harsh clutch maneuver where the clutch is declutched in a manual transmission without the occurrence of any misfire event. As shown in FIG. 10a, a harsh clutching maneuver causes large negative crankshaft velocity changes $\omega$ as shown by reference numerals 116. In all, a total of nine misfire events could be counted with some of the conventional misfire detection approaches. Turning to FIG. 10b, the first averaging filter output $\beta$ eliminates some of the false misfire reports; however, the events 116 may still be detected as false misfire reports. Turning to FIG. 10c, the dual-cascaded averaging filter output $\alpha$ adequately filters out the events introduced by the harsh clutching condition so that no false misfire reports are generated. It should be appreciated that three or more cascaded averaging filters may further reduce the effects introduced in the harsh clutching condition or other noise related events.

While a specific embodiment of the invention has been shown and described in detail to illustrate the principles of the present invention, it will be understood that the invention may be embodied otherwise without departing from such principles. For example, one skilled in the art will readily recognize from such discussion and from the accompanying drawings and changes that various changes, modifications and variations can be made therein without departing from the spirit and scope of the present invention as described in the following claims.

What is claimed is:

1. An apparatus for detecting misfires of cylinder firings in an internal combustion engine comprising:

means for measuring changes in engine speed corresponding to each of a plurality of expected cylinder firings;

first filter means for calculating an average change in engine speed over a plurality of cylinder firings for each expected cylinder firing and determining a first deviation between the average change in engine speed and a current change in engine speed corresponding to each expected cylinder firing, said first filter means outputting a series of said first deviations;

second filter means for calculating an average change in the first deviations output from the first filter means and determining a second deviation between the average change in first deviations and a current change in the first deviations corresponding to a selected cylinder; and comparison means for comparing the second deviation of the second filter means to a threshold value to determine if a misfire has occurred for the selected cylinder.

2. The apparatus as defined in claim 1 wherein said first filter means is cascade connected to the second filter means.

3. The apparatus as defined in claim 1 wherein said first filter means sorts a plurality of cylinder firings by amplitude and averages the two middle values to calculate the average change in engine speed.

4. The apparatus as defined in claim 1 wherein the plurality of cylinder firings in the first filter means comprises an even number.

5. The apparatus as defined in claim 1 wherein the plurality of expected cylinder firings in the first filter means comprise a number equal to the number of cylinders in the internal combustion engine.

6. The apparatus as defined in claim 1 wherein the threshold value is a function of engine speed and manifold pressure.

7. The apparatus as defined in claim 1 wherein said measuring means measures the engine speed as a function of change in angular position of a crankshaft associated with the engine over each expected cylinder firing.

8. A method of detecting misfires of cylinder firings in an internal combustion engine, said method comprising:

measuring changes in engine speed corresponding to each of a plurality of expected cylinder firings;

calculating an average change in engine speed over a plurality of the expected cylinder firings for each of a plurality of cylinders;

determining a first deviation between the average change in engine speed and a current selected change in engine speed for each of the cylinders and providing first filtered outputs therefrom;

calculating an average deviation from said first filtered outputs over a series of said first deviations;

determining a second deviation between the average deviation and a current selected first deviation to provide a second filtered output; and comparing the second filtered output to a threshold value to determine if a misfire has occurred for the selected cylinder.

9. The method as defined in claim 8 wherein the step of calculating an average change in engine speed comprises sorting the changes in engine speed for the plurality of expected cylinder firings and averaging the middle two values.

10. The method as defined in claim 8 wherein the step of calculating an average deviation from the first filtered output comprises the steps of sorting deviations over a plurality of expected engine cylinder firings and averaging the two middle deviations.

11. The method as defined in claim 8 further comprising the step of storing threshold values in memory as a function of engine speed and manifold pressure.

12. A method of detecting misfires of cylinder firings of an internal combustion engine, said method comprising:

measuring changes in engine speed corresponding to each of a plurality of cylinder firings;

processing the measured changes in engine speed with a first averaging filter including the steps of calculating an average change in angular velocity for each of the selected cylinders and determining first deviations between the average change in angular velocity and the current change in angular velocity for each of the corresponding selected cylinders and outputting a series of first deviations;

processing the deviations output from the first averaging filter including the steps of calculating an average deviation of the first deviations and determining a second deviation between the average deviation and a current one of said first deviations corresponding to the current selected cylinder; and determining if a misfire has occurred for the current selected cylinder by comparing the second deviation to a threshold value.

* * * * *